(12) United States Patent
Yamashita (10) Patent No.: US 7,356,334 B2
(45) Date of Patent: Apr. 8, 2008

(54) METHOD AND WIRELESS TERMINAL FOR REMOTE-CONTROLLING AUDIO REPRODUCING APPARATUS

(75) Inventor: Makoto Yamashita, Akishima (JP)

(73) Assignee: Kabushiki Kaisha Toshiba, Tokyo (JP)

(*) Notice: Subject to any disclaimer, the term of this patent is extended or adjusted under 35 U.S.C. 154(b) by 9 days.

(21) Appl. No.: 11/200,078

(22) Filed: Aug. 10, 2005

(65) Prior Publication Data

US 2006/0065709 A1 Mar. 30, 2006

(30) Foreign Application Priority Data

Sep. 27, 2004 (JP) ............... 2004-280484

(51) Int. Cl.
*H04M 3/00* (2006.01)
(52) U.S. Cl. .......... 455/420; 455/418; 455/419; 455/422.1
(58) Field of Classification Search ........ 455/420, 455/422.1, 418, 419, 550.1, 557, 566, 95; 700/94; 386/96
See application file for complete search history.

(56) References Cited

U.S. PATENT DOCUMENTS

| | | | | |
|---|---|---|---|---|
| 5,831,555 A * | 11/1998 | Yu et al. | .............. | 341/26 |
| 5,982,980 A * | 11/1999 | Tada | .............. | 386/96 |
| 6,990,589 B1 * | 1/2006 | Ohbayashi | .............. | 713/193 |
| 7,050,790 B2 * | 5/2006 | Yamaga | .............. | 455/412.1 |
| 7,065,342 B1 * | 6/2006 | Rolf | .............. | 455/412.1 |
| 2002/0002035 A1 * | 1/2002 | Sim et al. | .............. | 455/41 |
| 2002/0040255 A1 * | 4/2002 | Neoh | .............. | 700/94 |
| 2002/0140855 A1 * | 10/2002 | Hayes et al. | .............. | 348/465 |
| 2003/0122876 A1 * | 7/2003 | Berlad et al. | .............. | 345/773 |
| 2004/0090984 A1 * | 5/2004 | Saint-Hiaire et al. | .............. | 370/463 |

FOREIGN PATENT DOCUMENTS

| | | |
|---|---|---|
| JP | 2002-186063 | 6/2002 |
| JP | 2003-87874 | 3/2003 |
| JP | 2004-96165 | 3/2004 |

* cited by examiner

*Primary Examiner*—Joseph Feild
*Assistant Examiner*—Huy D. Nguyen
(74) *Attorney, Agent, or Firm*—Finnegan, Henderson, Farabow, Garrett & Dunner, L.L.P.

(57) ABSTRACT

A method for remote-controlling an operation of an audio reproducing apparatus using a wireless terminal that is equipped with a display device includes establishing wireless connection between the wireless terminal and the audio reproducing apparatus, sending an audio data acquisition request from the wireless terminal to the audio reproducing apparatus, sending, in response to the audio data acquisition request, content information, which is indicative of audio data items that are stored in a storage medium provided in the audio reproducing apparatus, from the audio reproducing apparatus to the wireless terminal, displaying on the display device of the wireless terminal a list of the audio data items based on the content information, and sending a reproduction command, which instructs reproduction of audio data that is selected from the list of the audio data items displayed on the display device, from the wireless terminal to the audio reproducing apparatus.

8 Claims, 9 Drawing Sheets

METHOD AND WIRELESS TERMINAL FOR REMOTE-CONTROLLING AUDIO REPRODUCING APPARATUS

CROSS-REFERENCE TO RELATED APPLICATIONS

This application is based upon and claims the benefit of priority from prior Japanese Patent Application No. 2004-280484, filed Sep. 27, 2004, the entire contents of which are incorporated herein by reference.

BACKGROUND OF THE INVENTION

1. Field of the Invention

The present invention relates to a remote-control method for remote-controlling the operation of an audio reproducing apparatus by a wireless terminal, and to a wireless terminal and an audio reproducing apparatus, to which the remote-control method is applied.

2. Description of the Related Art

In recent years, various types of audio reproducing apparatus, such as a portable audio player, have been developed. In usual cases, the control of the portable audio player is executed using a remote controller, which is attached to a headphone cable that is connected to the portable audio player.

The remote controller is used in such a state that the remote controller is fixed to, for example, a breast pocket of the user by means of a clip, etc. In order to perform operations for reproduction controls such as play, stop, fast forward, rewind and song skip, the user has to move the hand to the breast pocket and to operate the remote controller. When the user is to operate the remote controller, such a situation may arise that the headphone cable is erroneously pulled and removed from the ear.

To solve this problem, a remote control system, which controls the portable audio player by wireless signals, has recently begun to be developed (see, e.g. Jpn. Pat. Appln. KOKAI Publication No. 2003-87874). In the system disclosed in KOKAI 2003-87874, a mobile phone is used as a remote controller, and the reproduction operation of the portable audio player is controlled by wireless signals from the mobile phone.

In the meantime, a portable audio player with a large-capacity storage medium has recently been developed. This necessitates a function for efficiently select audio data to be reproduced, from many data that are stored in the storage medium.

In the system disclosed in KOKAI 2003-87874, however, no consideration is given to the user interface for selecting audio data that is to be reproduced by the portable audio player.

In usual cases, the display on the audio reproducing apparatus such as the portable audio player is too small in screen size to display sufficient information. Since the screen size of the display of the mobile phone is relatively large, it is necessary to realize a novel interface that can make advantageous use of this screen size.

BRIEF SUMMARY OF THE INVENTION

According to an embodiment of the present invention, there is provided a remote control method for remote-controlling an operation of an audio reproducing apparatus using a wireless terminal that is equipped with a display device, the method comprising: establishing wireless connection between the wireless terminal and the audio reproducing apparatus; sending an audio data acquisition request from the wireless terminal to the audio reproducing apparatus by a wireless signal; sending, in response to the audio data acquisition request from the wireless terminal, content information, which is indicative of audio data items that are stored in a storage medium provided in the audio reproducing apparatus, from the audio reproducing apparatus to the wireless terminal by a wireless signal; displaying on the display device of the wireless terminal a list of the audio data items that are stored in the storage medium based on the content information from the audio reproducing apparatus; and sending a reproduction command, which instructs reproduction of audio data that is selected from the list of the audio data items displayed on the display device, from the wireless terminal to the audio reproducing apparatus by a wireless signal.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will now be described with reference to the accompanying drawings.

Figure 1:
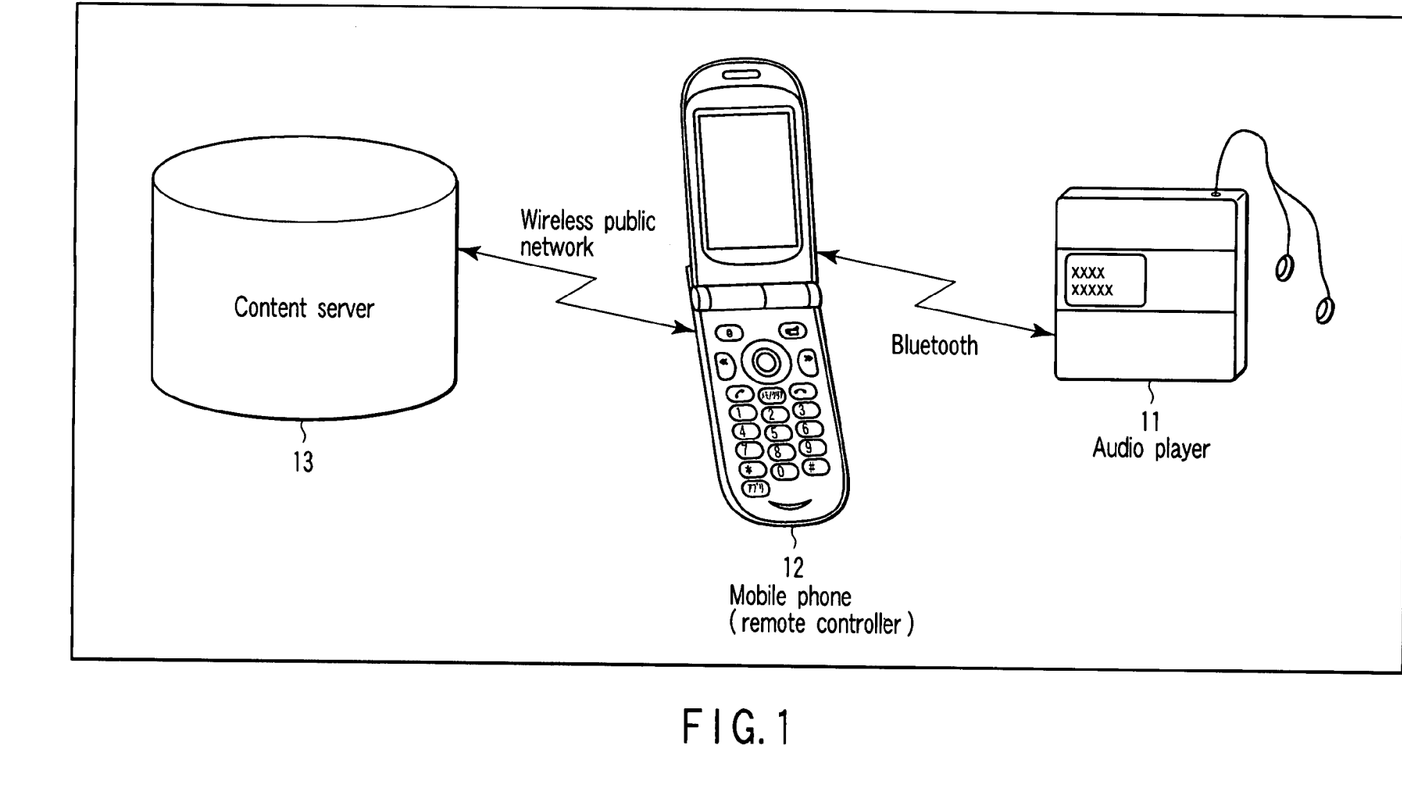
FIG. 1 shows an example of the configuration of a remote control system using a remote control method according to an embodiment of the present invention.

FIG. 1 shows an example of the configuration of a remote control system using a remote control method according to an embodiment of the present invention. The remote control system comprises a portable audio player 11 and a remote controller 12. The portable audio player 11 is an apparatus that reproduces audio data. The remote controller 12 is a display-equipped wireless terminal for remote-controlling the portable audio player 11 by wireless signals. For example, the remote controller 12 is realized as a mobile phone or a PDA (Personal Digital Assistant). In the description below, it is assumed that the remote controller 12 is realized as a mobile phone.

Each of the portable audio player 11 and mobile phone 12 includes a wireless communication unit that supports the Bluetooth standard. The Bluetooth is a standard for short-distance wireless communication. Wireless communication between the portable audio player 11 and mobile phone 12 is executed according to the Bluetooth standard. In the present embodiment, wireless communication between the portable audio player 11 and mobile phone 12 is executed according to, for example, an audio video remote control profile (AVRCP) that is stipulated in the Bluetooth standard. In this case, the portable audio player 11 functions as a target (TG) that is specified in the AVRCP, and the mobile phone 12 functions as a controller (CT) that is specified in the AVRCP.

The mobile phone 12 sends a command, or the like, for remote-controlling the portable audio player 11 to the portable audio player 11 by a wireless signal. The portable audio player 11 sends various information necessary for remote-controlling the portable audio player 11 to the mobile phone 12 by a wireless signal.

The mobile phone 12 communicates with an external content server 13 over a wireless public network (mobile phone network) so that the mobile phone 12 may download an audio remote control application from the content server 13. The audio remote control application is an application program for remote-controlling the portable audio player 11. The mobile phone 12 executes the audio remote control application, thus functioning as a remote controller for remote-controlling the portable audio player 11.

Figure 2:
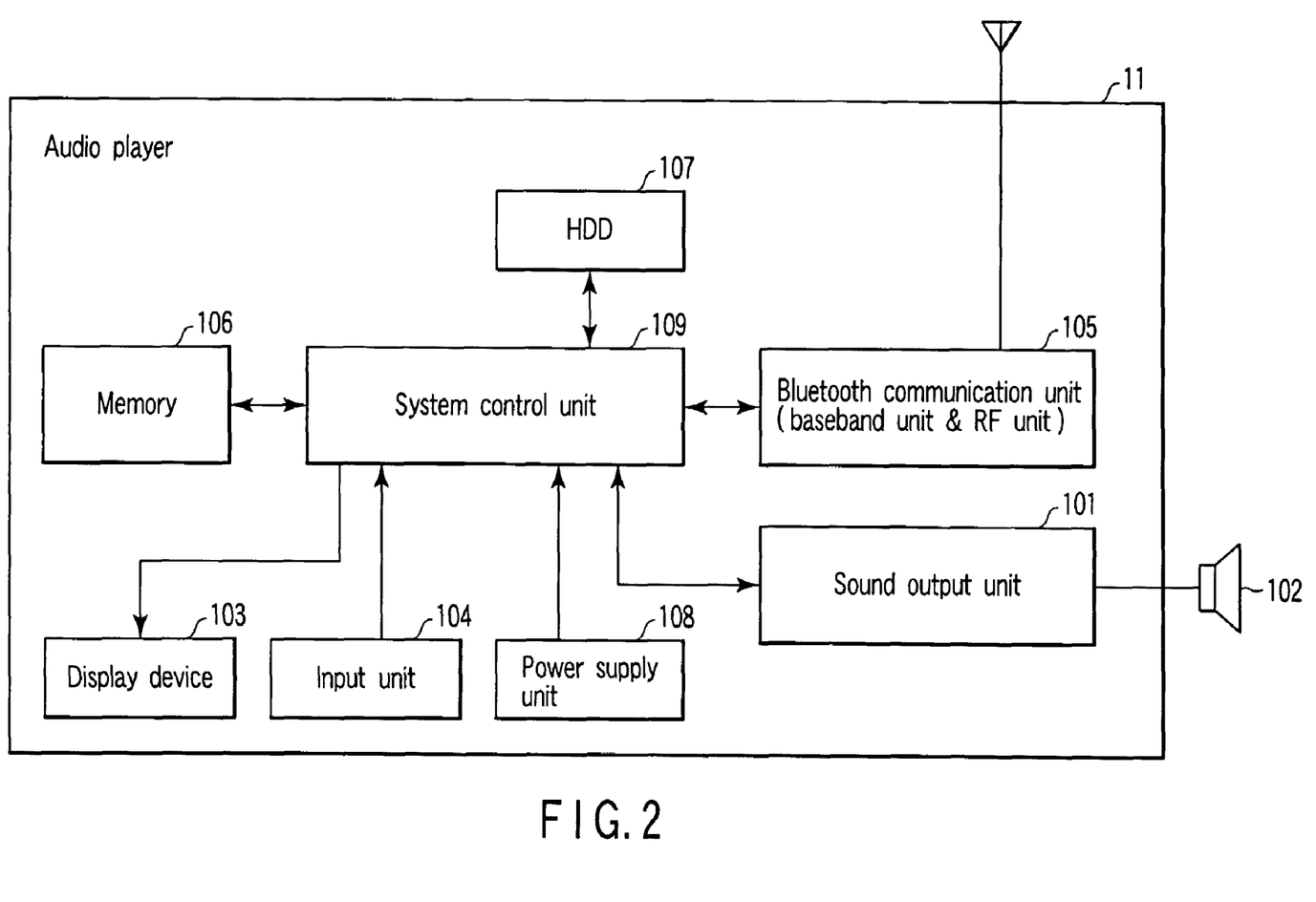
FIG. 2 is a block diagram that shows the structure of an audio player, which is used in the remote control system shown in FIG. 1.

Next, referring to FIG. 2, the structure of the portable audio player 11 is described.

The portable audio player 11, as shown in FIG. 2, comprises a sound output unit 101, a headphone 102, a display device 103, an input unit 104, a wireless communication unit 105, a memory 106, a hard disk drive (HDD) 107, a power supply unit 108 and a system control unit 109.

The sound output unit 101 is a sound controller that converts to-be-reproduced audio data from a digital signal format to an analog signal format. The headphone 102 is connected to the sound output unit 101 over a headphone cable. The display device 103 displays various information that is necessary for the user to operate the portable audio player 11. For example, the display screen on the display device 103 displays reproduction information (audio data title, artist name, album title, elapsed time from reproduction start, play mode, etc.) relating to audio data that is being reproduced or is selected as an object of reproduction. The display screen on the display device 103 also displays information relating to a sound volume and a sound quality (type of equalizer) of the audio data that is currently being reproduced.

The input unit 104 comprises various button switches for operating the portable audio player 11. The user operates the input unit 104, thereby executing a reproduction control such as selection of audio data to be reproduced, play of audio data, stop (pause), fast forward, rewind and song skip. The wireless communication unit 105 executes wireless communication with another Bluetooth device. The wireless communication unit 105 includes a baseband unit and an RF unit.

The memory 106 is used as a working area of the system control unit 109. The memory 106 stores various programs, which are executed by the system control unit 109, and various data. The HDD 107 is a storage medium that is capable of storing many audio data. Files, which correspond to the respective audio data stored in the HDD 107, are classified into a plurality of folders and managed by a file system that is executed by the system control unit 109. The power supply unit 108 includes a battery (or a dry cell) and a power supply circuit that generates an operation power from the battery, which is to be supplied to the respective components of the portable audio player 11. The system control unit 109 is a processor that controls the operation of the portable audio player 11. The system control unit 109 executes various processes for enabling the portable audio player 11 to function as an audio player, and also executes management of audio data stored in the HDD 107 and a control for the wireless communication unit 105.

Figure 3:
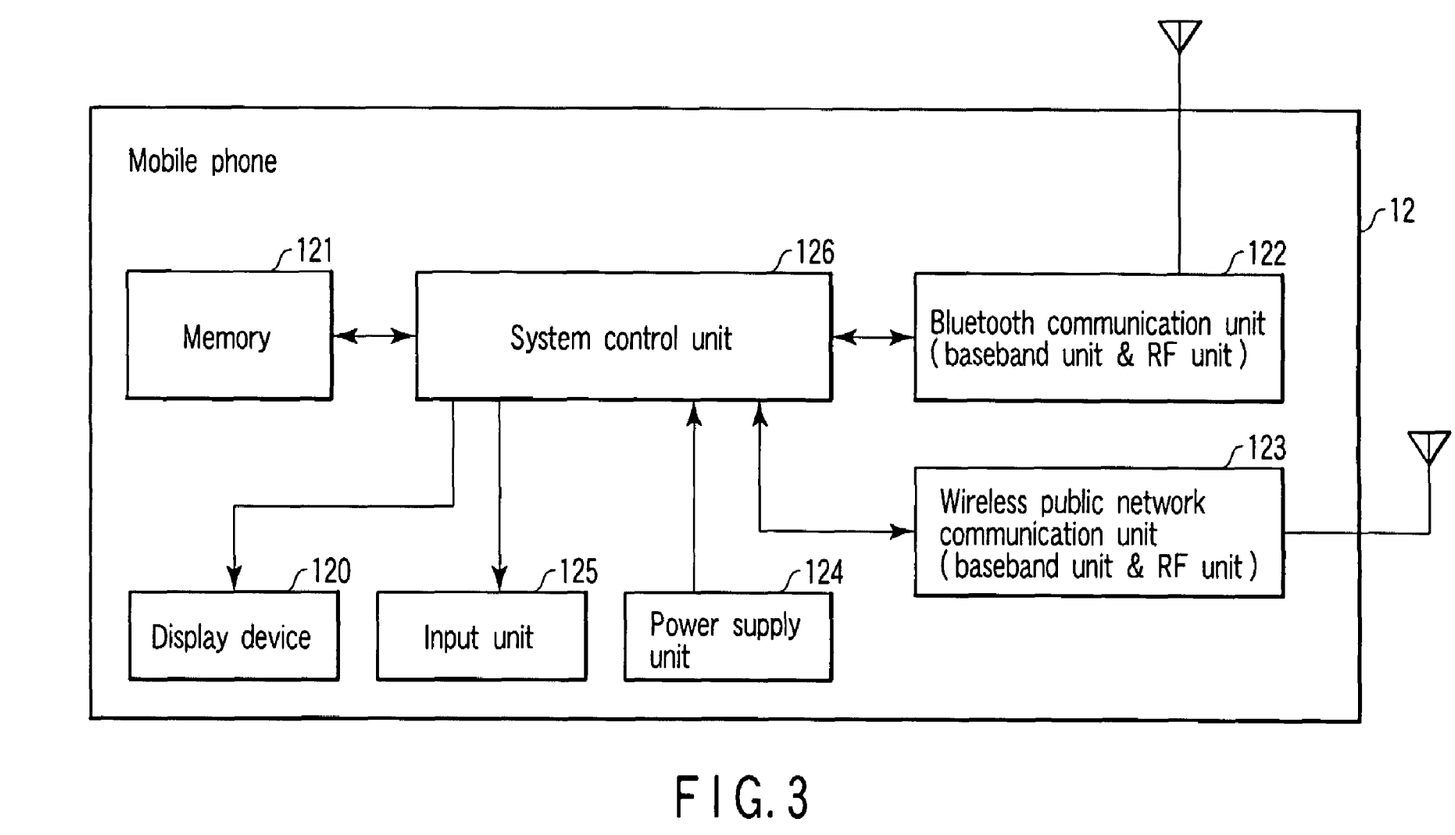
FIG. 3 is a block diagram that shows the structure of a remote controller, which is used in the remote control system shown in FIG. 1.

Next, the structure of the mobile phone 12 is described referring to FIG. 3.

The mobile phone 12, as shown in FIG. 3, comprises a display device 120, a memory 121, a first wireless communication unit 122, a second wireless communication unit 123, a power supply unit 124, an input unit 125 and a system control unit 126.

The display device 120 displays various information that is necessary for the user to operate the mobile phone 12. The display screen of the display device 120 has a greater size (resolution) than that of the display device 103 of the portable audio player 11 and is able to display a greater quantity of information at a time than the display device 103. In the case where the audio remote control application is executed in the mobile phone 12, various information that is necessary for the user to remote-control the portable audio player 11 is displayed on the display screen of the display device 120 by the audio remote control application as a user interface for audio remote control.

The memory 121 is used as a working area of the system control unit 126. The memory 121 stores various programs, which are executed by the system control unit 126, and various data. The first wireless communication unit 122 executes wireless communication with another Bluetooth device. The first wireless communication unit 122 includes a baseband unit and an RF unit. The second wireless communication unit 123 executes wireless communication with the mobile phone network via a base station. The power supply unit 124 includes a battery (or a dry cell) and a power supply circuit that generates an operation power from the battery, which is to be supplied to the respective components of the mobile phone 12.

The input unit 125 comprises various button switches (keys) for operating the mobile phone 12. The user operates the input unit 125, thereby a control for a telephone function and a remote control for the portable audio player 11 are performed. The system control unit 126 is a processor that controls the operation of the mobile phone 12. The system control unit 126 executes various processes for realizing the telephone function of the mobile phone 12, and also executes various processes for enabling the mobile phone 12 to function as a remote controller, according to the audio remote control application.

Figure 4:
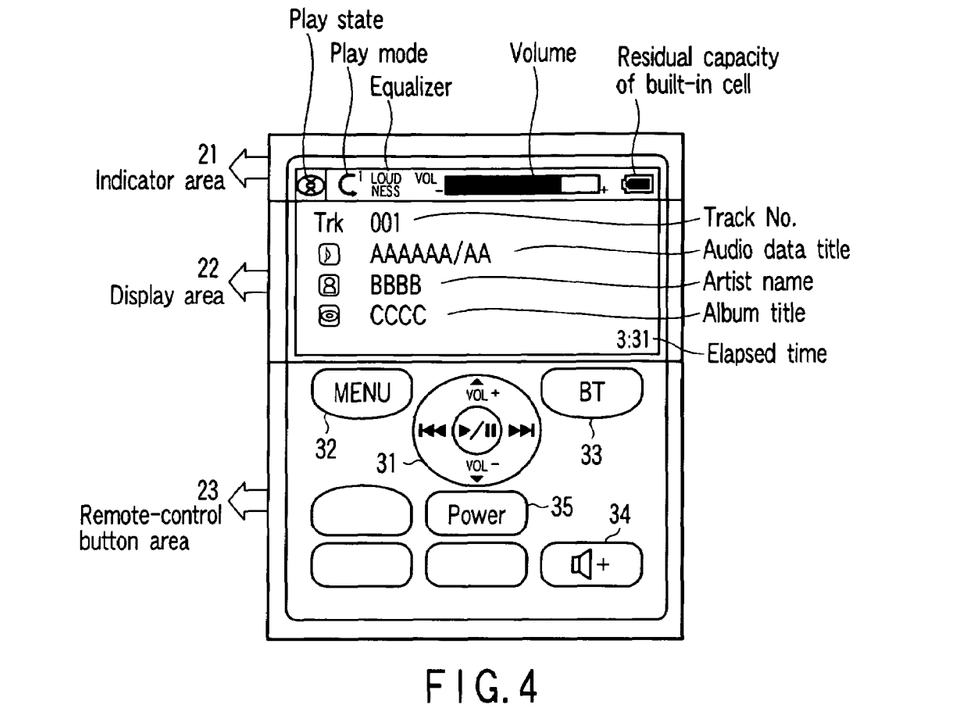
FIG. 4 shows an example of a remote control screen that is displayed on a display unit of the remote controller shown in FIG. 3.

FIG. 4 shows an example of a remote control screen that is displayed on the display device 120 of the mobile phone 12 by the audio remote control application.

The remote control screen, as shown in FIG. 4, displays an indicator area 21, a display area 22 and a remote-control button area 23. The indicator area 21 displays information such as a current play mode (normal play, folder play, repeat play, random play, etc.), a current sound quality (type of currently selected equalizer) and a current sound volume, as reproduction environment information that is indicative of an audio data reproduction environment currently set in the portable audio player 11. The indicator area 21 also displays a current residual battery capacity. The display area 22 displays reproduction information (track number, audio data title, artist name, album title, elapsed time from reproduction start, etc.) relating to audio data that is currently being reproduced or that is selected as an object of reproduction.

Figure 5:
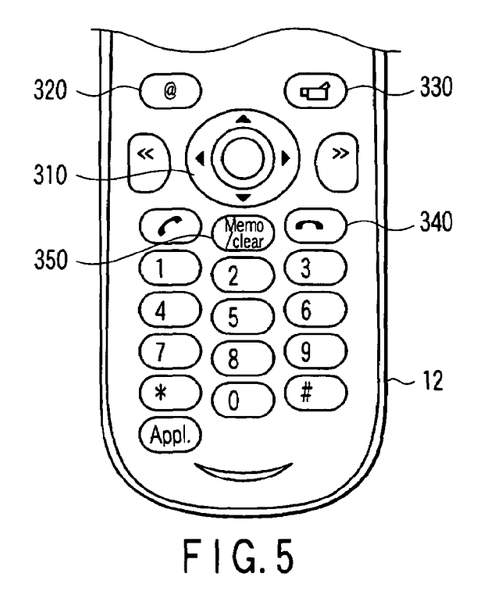
FIG. 5 shows an example of keys provided on the remote controller shown in FIG. 3.

The remote-control button area 23 is an operational guidance display area that presents to the user, information as to which keys on the mobile phone 12 are assigned to the functions for remote-controlling the portable audio player 11. The remote-control button area 23 displays a plurality of buttons (icons) 31 to 35 for giving guidance to the user in connection with the functions that are assigned to the keys of the mobile phone 12. The positions of the buttons 31 to 35 on the remote-control button area 23 correspond to the positions of the keys on the mobile phone 12 shown in FIG. 5. The button 31 indicates that the functions corresponding to the play/stop (pause), fast forward (or skip to the next song), fast rewind (or skip to the previous song), volume-up and volume-down are assigned to a cursor key 310 of the mobile phone 12. The "menu" button 32 indicates that the function for displaying the operation menu is assigned to a key 320 of the mobile phone 12. The "BT" button 33 indicates that the function for setting a Bluetooth wireless communication operation is assigned to a key 330 on the mobile phone 12. The button 34 indicates that the function for altering the type of equalizer, which is used by the audio player 11, is assigned to a key 340 of the mobile phone. The "power" button 35 indicates that the function for powering on/off the audio player 11 is assigned to a key 350 of the mobile phone 12.

Figure 6:
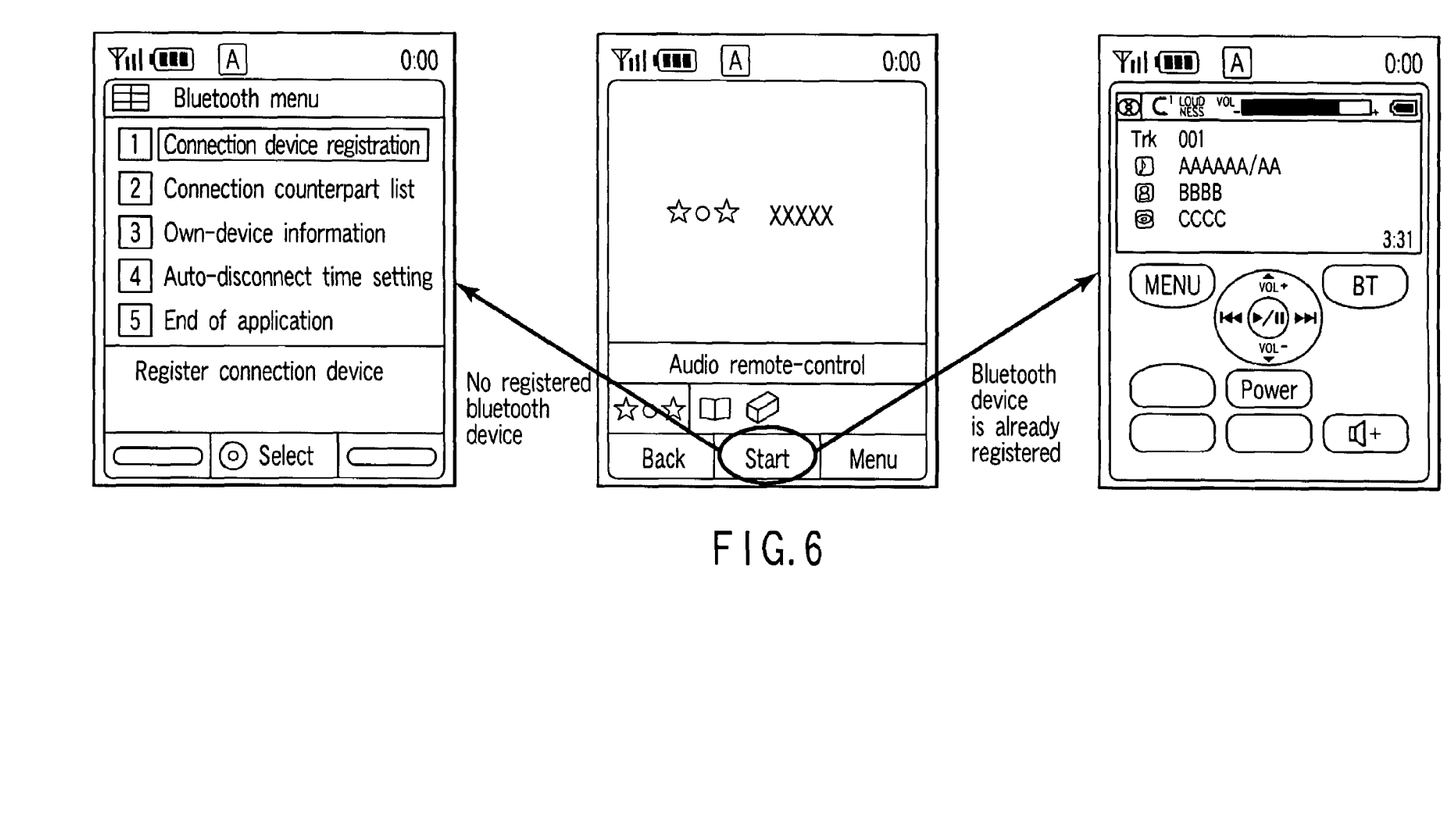
FIG. 6 is a view for explaining a process that is executed at a time of starting an audio remote control application within the remote controller shown in FIG. 3.

Next, referring to FIG. 6, a description is given of a process that is executed by the audio remote control application when the audio remote control application is started.

In the state in which the audio remote control application (AUDIO remote control) is selected as a to-be-executed application, the specified key on the mobile phone 12, which corresponds to the "Start" key, is pressed. Thereby, the audio remote control application is executed. In this case, the audio remote control application first determines whether the audio player 11 is registered in the mobile phone 12 as a communication-counterpart Bluetooth device. If the audio player 11 is already registered, the audio remote control application displays the remote control screen that has been described with reference to FIG. 4. The audio remote control application establishes wireless connection (Bluetooth link) between the audio player 11 and the mobile phone 12 and starts wireless communication with the audio player 11. By the wireless communication with the audio player 11, the audio remote control application acquires from the audio player 11 the reproduction information relating to currently selected audio data and reproduction environment information such as a sound quality and a sound volume. The audio remote control application displays the reproduction information and the reproduction environment information on the remote control screen. In this state, if the user operates the key on the mobile phone 12, which corresponds to, e.g. the "Play/Stop (Pause)" button, the audio remote control application sends a command (key code) that instructs reproduction to the audio player 11 by a wireless signal. Thereby, the audio player 11 reproduces the currently selected audio data. If the user operates the key on the mobile phone 12, which corresponds to the "Fast Forward" button, the audio remote control application sends a command (key code) that instructs skip to the next song to the audio player 11 by a wireless signal. Thereby, the audio player 11 selects audio data that is the next data of the currently selected audio data. The reproduction information relating to the selected audio data is transmitted from the audio player 11 to the mobile phone 12 by a wireless signal, and the reproduction information is displayed on the remote control screen.

On the other hand, if the audio player 11 is not registered as the communication-counterpart Bluetooth device, the audio remote control application displays a setting screen (Bluetooth menu) for setting the Bluetooth communication function, thus prompting the user to register the Bluetooth device. If the user selects "Connection Device Registration" on the setting screen, the audio remote control application starts a process for registering a Bluetooth device. In this case, the audio remote control application executes, e.g. a device discovery process for detecting a Bluetooth device that is present near the mobile phone 12.

The user is able to start functions, such as "Connection Counterpart List" display, "Own-Device Information" display, "Auto-Disconnect Time Setting" and "End of Application", on the setting screen. If the "Connection Counterpart List" is selected by the user, the audio remote control application displays the list of Bluetooth devices that are registered in the mobile phone 12. If the "Own-Device Information" is selected by the user, the audio remote control application displays information such as the Bluetooth address of the mobile phone 12. If the "End of Application" is selected by the user, the audio remote control application is ended.

Next, a description is given of a process for displaying on the display device 120 of mobile phone 12 a list of audio data that are stored in the audio player 11, and for selecting to-be-reproduced audio data from the list.

(1) Establishment of Wireless Connection: To start with, a process for establishing wireless connection between the mobile phone 12 and audio player 11 is executed.

(2) Request for Acquisition of Audio Data: The audio remote control application sends an audio data acquisition request to the audio player 11 by a wireless signal.

(3) Transmission of Content Information: Responding to the audio data acquisition request from the mobile phone 12, the audio player 11 transmits content information (list information), which is indicative of the audio data items stored in the HDD 107, to the mobile phone 12 by a wireless signal.

(4) Display of Audio Data List: Based on the content information from the audio player 11, the audio remote control application displays the list of the audio data items stored in the HDD 107 on the display device 120. Since the resolution (pixel number that is displayable) of the display device 120 of the mobile phone 12 is sufficiently high, this display device 120 is able to display, at a time, a list of audio data that contains a greater quantity of audio data than a list of audio data that is displayable on the display device 103 of the audio player 11.

(5) Selection of Audio Data: The user can select to-be-reproduced audio data from the list of audio data.

(6) Transmission of Reproduction Command: The audio remote control application sends a reproduction command, which instructs reproduction of selected audio data, to the audio player 11 by a wireless signal.

(7) Reproduction: The audio player 11 reproduces the audio data and transmits the reproduction information and reproduction environment information relating to the currently reproduced audio data to the mobile phone 12 by a wireless signal. The audio remote control application displays the reproduction information and reproduction environment information on the remote control screen.

In this way, the list of audio data stored in the HDD 107 of audio player 11 is displayed on the display device 120 of mobile phone 12. Thereby, the display device 120 with a high resolution can effectively be used, and the user can easily select the audio data that is to be reproduced.

As has been described above, the audio data items that are stored in the HDD 107 are classified into a plurality of folders and managed. Thus, actually, the list of audio data is displayed on a folder-by-folder basis. In addition, all audio data in a certain folder can be batch-selected as an object of reproduction (folder play).

Figure 7:
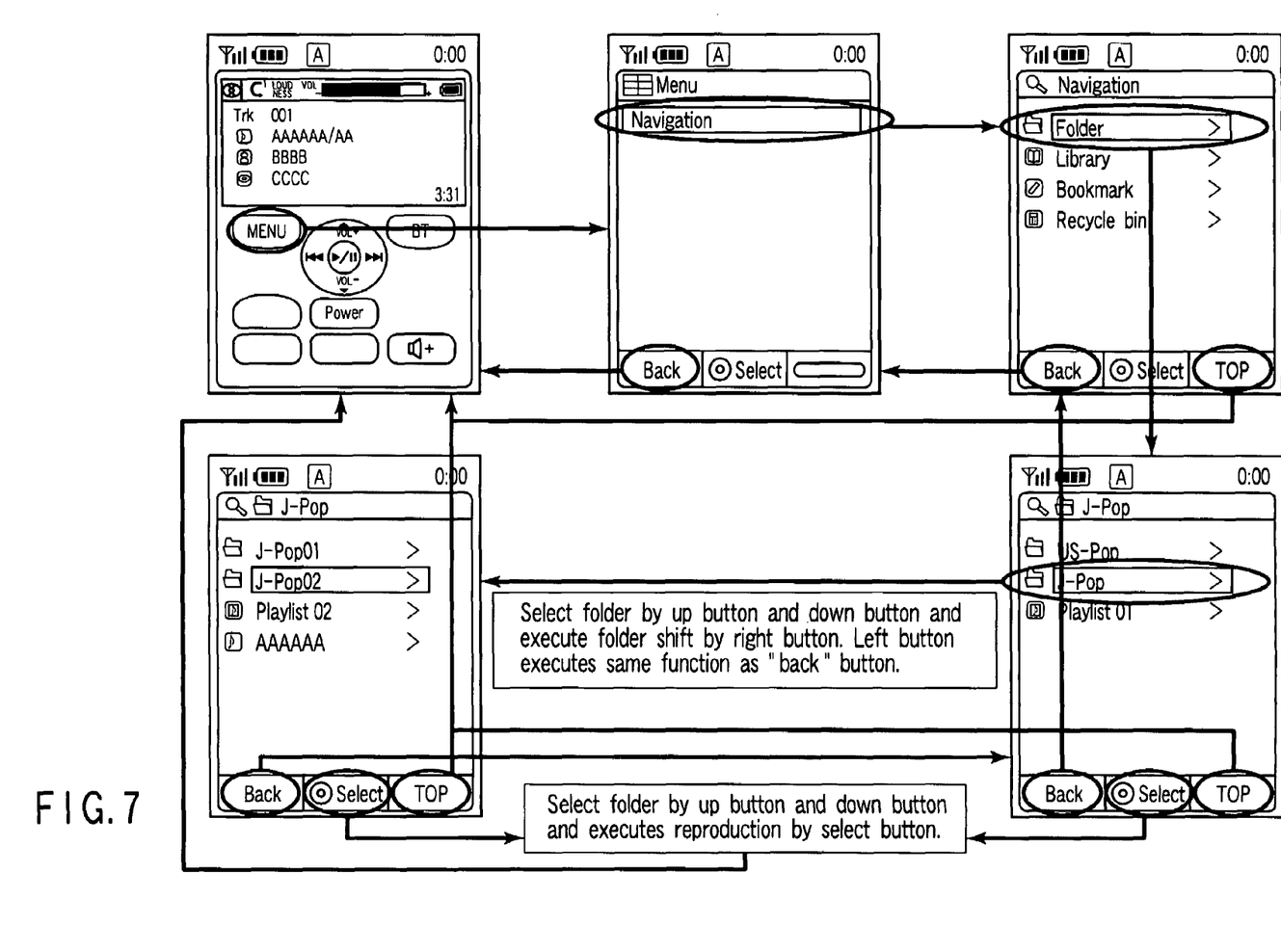
FIG. 7 is a view for explaining a process procedure in a case of executing folder play using the remote controller shown in FIG. 3.

Next, referring to FIG. 7, a process procedure for the above-mentioned folder play is described.

(1) Menu Display

When the user has pressed the key on the mobile phone 12, which corresponds to the "menu" button on the remote control screen, the audio remote control application displays a menu screen on the display device 120. If an item "Navigation" on the menu screen is selected by the key operation on the mobile phone 12, the audio remote control application displays items "Folder", "Library", "Bookmark" and "Recycle Bin".

(2) Display of Folder List

If the item "Folder" is selected by the key operation on the mobile phone 12, the audio remote control application sends a folder display command to the audio player 11 as an audio data acquisition request by a wireless signal. The audio player 11 transmits content information, which is indicative of a folder list, to the mobile phone 12 by a wireless signal. Based on the content information, the audio remote control application displays the folder list on the display device 120. In FIG. 7, three folder names, "US-POP", "J-POP" and "Playlist 01", are displayed. A mark ">" is displayed beside the folder name of the folder that includes a sub-folder on a lower-level layer.

(3) Selection of Folder

The user can select a desired folder by operating an upward key (UP button) or a downward key (DOWN button) of the cursor key 310. In addition, if the user operates a rightward key (RIGHT button) of the cursor key 310, a list of audio data and sub-folders, which belong to the selected folder, is displayed.

(4) Reproduction

In the state in which a certain folder or audio data is selected, if the user operates the key on the mobile phone 12, which corresponds to a selection button, the audio data in the selected folder or the selected audio data begins to be reproduced. For example, in the state in which a certain folder is selected, if the user operates the key of the mobile phone 12 that corresponds to the selection button, the audio remote control application sends a command, which instructs reproduction of all audio data belonging to the selected folder, to the audio player 11 by a wireless signal. The audio player 11 successively reproduces all the audio data belonging to the selected folder.

Figure 8:
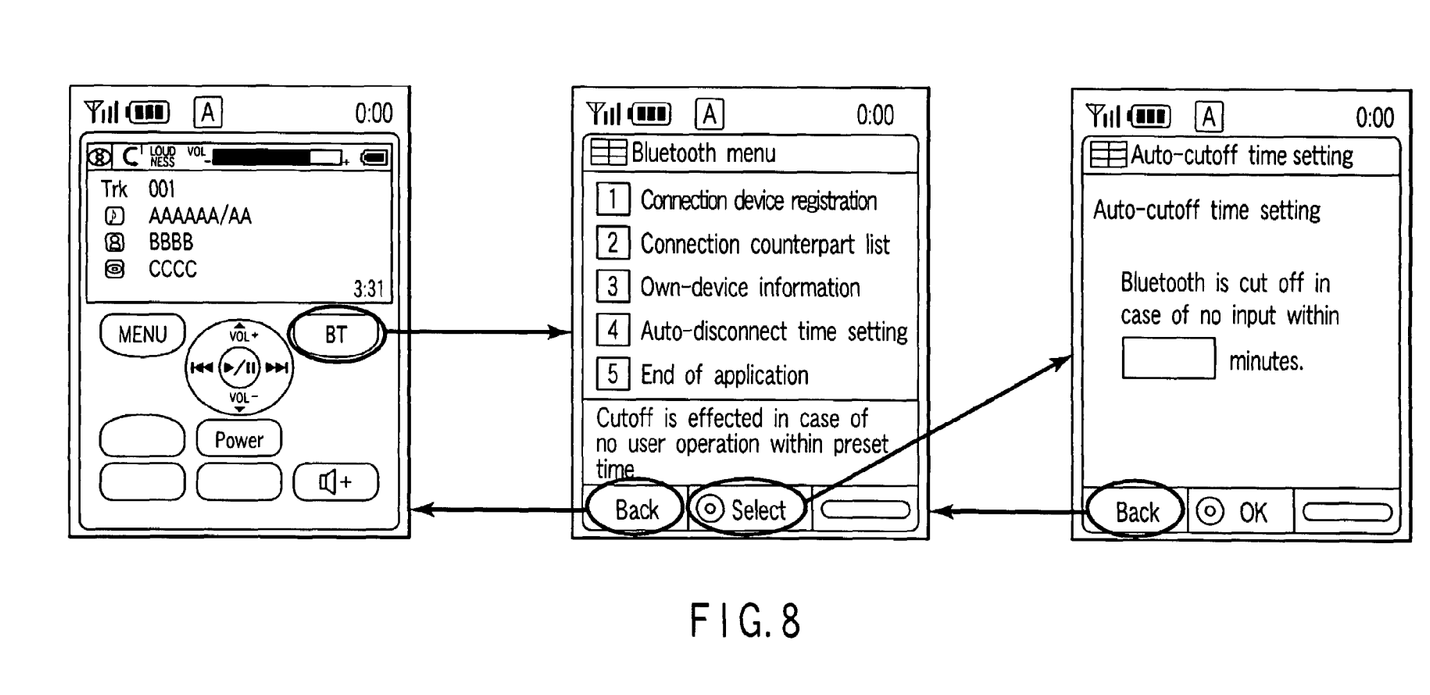
FIG. 8 is a view for explaining an auto-disconnect function that is provided in the remote controller shown in FIG. 3.

Next, referring to FIG. 8, an auto-disconnect function is described.

The auto-disconnect function is a function for automatically disconnecting, if the mobile phone 12 is not operated for a predetermined time period, the wireless connection between the mobile phone 12 and audio player 11 in the state in which the audio player 11 continues the reproduction operation of audio data. In the state in which the wireless connection between the mobile phone 12 and audio player 11 is established, data transfer between the mobile phone 12 and audio player 11 is periodically executed even if no command is sent from the mobile phone 12 to the audio player 11. This wireless communication increases the power consumption of the mobile phone 12. Making use of the auto-disconnect function, the power consumption of the mobile phone 12 can be reduced. An auto-disconnect time is set by the following procedure.

(1) Display of Bluetooth Menu

If the user operates the key of the mobile phone 12 that corresponds to the "BT" button on the remote control screen, the audio remote control application displays a Bluetooth menu screen on the display device 120.

(2) Setting of Auto-Disconnect Time

If "Auto-Disconnect Time Setting" on the Bluetooth menu screen is selected, the audio remote control application displays a screen for the auto-disconnect time setting, which includes an input field for inputting an auto-disconnect time.

The audio remote control application stores the time, which has been input in the input field, in the environment setting file as auto-disconnect time setting. If an input for operating the audio remote control application is not executed for a predetermined time period (i.e. the auto-disconnect time stored in the environment setting file), the audio remote control application automatically disconnects (cuts off) the wireless connection between the mobile phone 12 and the audio player 11. Even after the wireless connection is cut off, the audio player 11 continues current reproduction of audio data. The user can start the audio remote control application only when necessary, and can remote-control the audio player 11.

Figure 9:
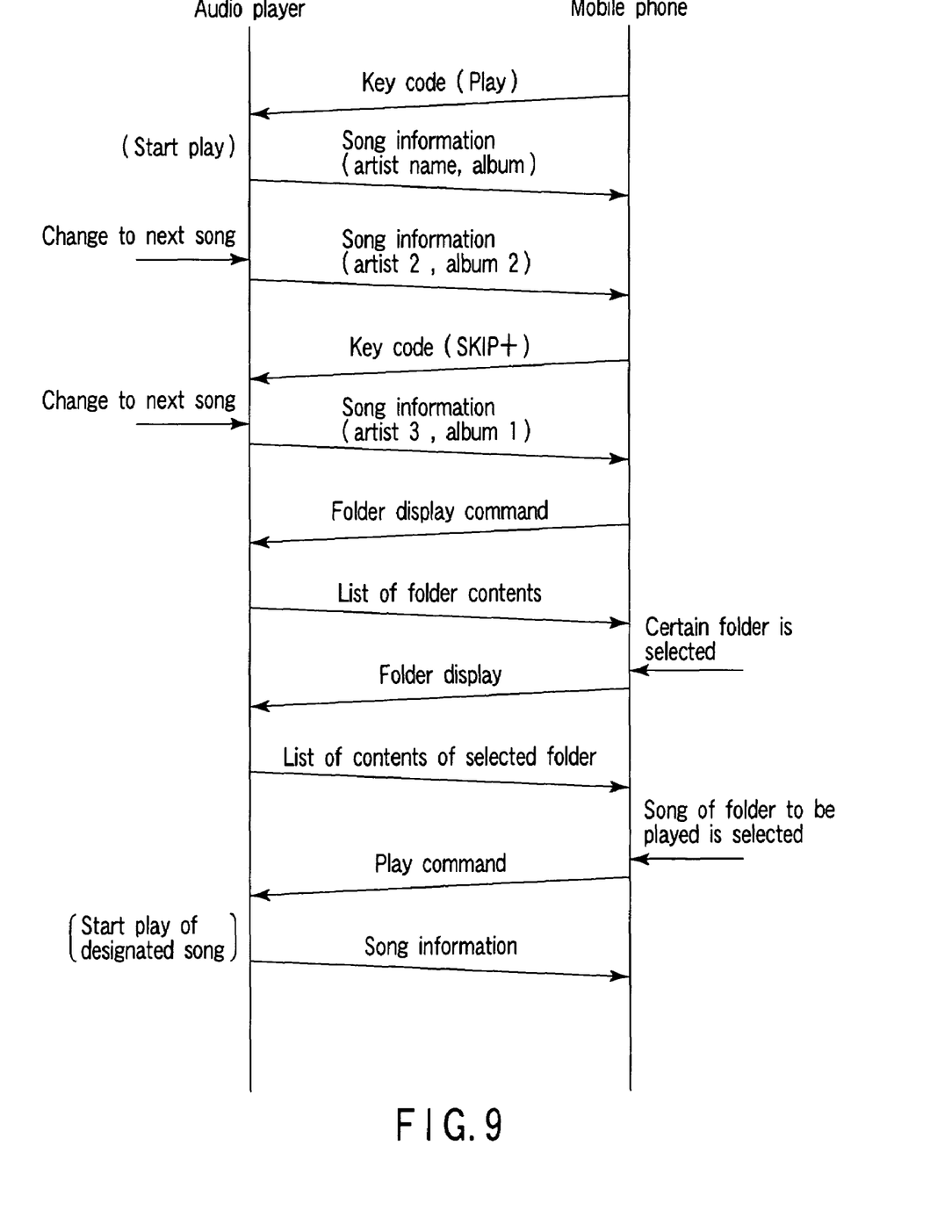
FIG. 9 is a view for explaining data transmission that is executed between the remote controller and audio player in the remote control system shown in FIG. 1.

Next, data transmission between the mobile phone 12 and audio player 11 is described with reference to FIG. 9.

If the key on the mobile phone 12, which corresponds to the play/stop (pause) button on the remote control screen, is operated, the mobile phone 12 sends a key code of the operated key to the audio player 11 as a reproduction command by a wireless signal. The audio player 11 starts reproduction of the currently selected audio data and sends reproduction information (song information such as an audio data title, an artist name and an album title) relating to the currently reproduced audio data to the mobile phone 12 by a wireless signal. The reproduction information is displayed on the remote control screen.

If the reproduction of the currently selected audio data ends, the audio player 11 starts reproduction of the next audio data. In this case, the audio player 11 sends reproduction information (song information such as an audio data title, an artist name and an album title) relating to the next audio data to the mobile phone 12 by a wireless signal. The reproduction information is displayed on the remote control screen.

If the key on the mobile phone 12, which corresponds to the fast-forward button on the remote control screen, is operated, the mobile telephone 12 sends the associated key code to the audio player 11 as a command for instructing skip of audio data by a wireless signal. The audio player 11 selects the next audio data that follows the currently selected audio data, and starts reproducing the next audio data. In addition, the audio player 11 sends reproduction information (song information such as an audio data title, an artist name and an album title) relating to the next audio data to the mobile phone 12 by a wireless signal. The reproduction information is displayed on the remote control screen.

If the user selects "Folder" by using the above-described "Navigation" function, the mobile phone 12 sends a folder display command, which requests a list of all folders, to the audio player 11 by a wireless signal. The audio player 11 transmits content information, which is representative of a list of the folders stored in the HDD 107, to the mobile phone 12 by a wireless signal. The list of folders is displayed on the display device 120 of the mobile phone 12. If a folder in the list is selected by the user, the mobile phone 12 sends a folder display command, which requests a list of audio data and sub-folders in the selected folder, to the audio player 11 by a wireless signal. The audio player 11 transmits the list of audio data and sub-folders in the selected folder to the mobile phone 12 by a wireless signal. The list of audio data and sub-folders is displayed on the display device 120 of mobile phone 12. If audio data in the list is selected by the user, the mobile phone 12 sends a reproduction command for instructing reproduction of the selected audio data to the audio player by a wireless signal. The audio player 11 starts reproducing the audio data designated by the reproduction command, and sends reproduction information relating to the audio data to the mobile phone 12 by a wireless signal.

As has been described above, according to the present embodiment, the display device 120 of the mobile phone 12 displays the list of folders and audio data that are stored in the audio player 11. Thus, the user can easily select a to-be-reproduced folder and audio data in the list, while viewing the display device 120 of the mobile phone 12. The audio player 11 is not necessarily of a portable type, and it may be a stationary audio apparatus.

Figure 10:
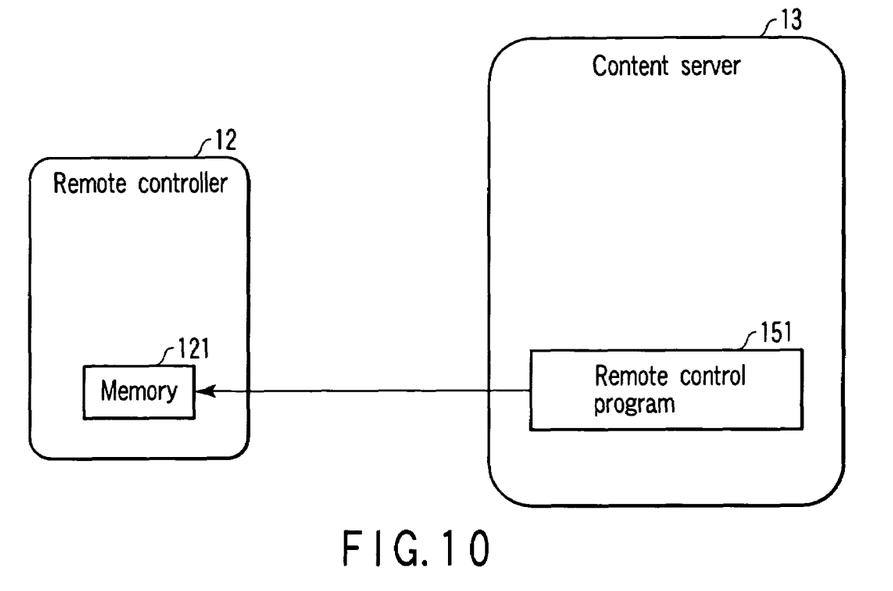
FIG. 10 illustrates a scheme in which the remote controller in the remote control system shown in FIG. 1 downloads an application from a content server.

FIG. 10 illustrates a relationship between the content server 13 and the mobile phone (remote controller) 12.

The mobile phone (remote controller) 12 accesses the content server 13 using the second wireless communication unit 123, thus being able to download a latest-version audio remote control application (remote control program) 151. The downloaded audio remote control application is stored in the memory 121 of the mobile phone 12. The audio remote control application that is stored in the memory 121 is executed by the system control unit 126.

Hence, such a merit is obtained that even when a new audio player is put on the market in the future, the mobile phone is applicable to such a new audio player by downloading a remote control program that supports the new audio player.

Figure 11:
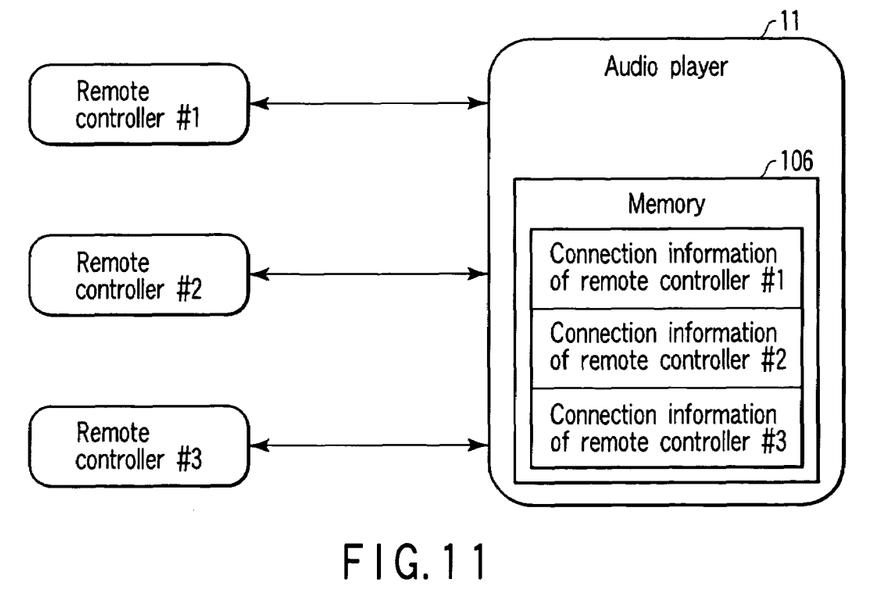
FIG. 11 shows an example in which the audio player is operated by a plurality of remote controllers in the remote control system shown in FIG. 1.

FIG. 11 illustrates a scheme in which the audio player 11 is shared by a plurality of users. The audio player 11 is realized, for example, as a stationary audio apparatus.

The users can remote-control the audio player 11 using their own mobile phones (remote controllers) #1, #2 and #3. Only one mobile phone (remote controller) is connectable to the audio player 11 at a time.

The memory 106 of the audio player 11 stores connection information corresponding to the respective mobile phones (remote controllers) #1, #2 and #3, in association with identification information for identifying these mobile phones (remote controllers). As the identification information, for example, Bluetooth addresses of the mobile phones (remote controllers) #1, #2 and #3 are used. The connection information is indicative of the last reproduced audio data and the audio data reproduction environment (volume, sound quality (type of equalizer), play mode, etc.). If the audio player 11 receives reproduction control information for adjusting the sound volume and sound quality from the mobile phone (remote controller) that is currently wirelessly connected to the audio player 11, the audio player 11 adjusts the sound volume and quality on the basis of the reproduction control information and stores reproduction control environment information, which is representative of the adjusted sound volume and quality, as one of connection information items in association with the identification information of the currently wirelessly connected mobile phone (remote controller).

When a certain mobile phone (remote controller) is newly wirelessly connected to the audio player 11, the audio player 11 retrieves from the memory 106 the connection information corresponding to the identification information of the mobile phone (remote controller). Based on the retrieved connection information, the audio player 11 restores the audio data reproduction environment of the audio player 11 to the audio reproduction environment corresponding to the newly connected mobile phone (remote controller).

As has been described above, the settings in the audio player 11 are automatically altered in accordance with the remote controller that is wirelessly connected to the audio player 11. Each user is thus enabled to automatically set the previously reproduced song, type of equalizer, play mode and volume, simply by wirelessly connecting his/her own mobile phone (remote controller) to the audio player 11.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A remote control method for remote-controlling an operation of an audio reproducing apparatus using a wireless terminal that is equipped with a display device, the method comprising:

establishing wireless connection between the wireless terminal and the audio reproducing apparatus;

sending an audio data acquisition request from the wireless terminal to the audio reproducing apparatus by a wireless signal;

sending, in response to the audio data acquisition request from the wireless terminal, content information, which is indicative of audio data items that are stored in a storage medium provided in the audio reproducing apparatus, from the audio reproducing apparatus to the wireless terminal by a wireless signal;

displaying on the display device of the wireless terminal a list of the audio data items that are stored in the storage medium based on the content information from the audio reproducing apparatus;

sending a reproduction command, which instructs reproduction of audio data that is selected from the list of the audio data items displayed on the display device, from the wireless terminal to the audio reproducing apparatus by a wireless signal; and disconnecting, if the wireless terminal is not operated for a predetermined time period, wireless connection between the wireless terminal and the audio reproducing apparatus in a state in which an operation of reproducing audio data by the audio reproducing apparatus is continued.

2. The remote control method according to claim 1, wherein the audio data items that are stored in the storage medium are classified into a plurality of folders, said displaying the list of the audio data items includes displaying on the display device a list of a plurality of folders based on information relating to the plurality of folders, which is included in the content information, and said sending the reproduction command includes sending, when one of the plurality of folders is selected as an object of reproduction, a command that instructs reproduction of all audio data belonging to the selected folder, from the wireless terminal to the audio reproducing apparatus by a wireless signal.

3. The remote control method according to claim 1, wherein the wireless terminal is a mobile phone that includes a first wireless communication unit that executes wireless communication with a mobile phone network, and a second wireless communication unit that executes wireless communication with the audio reproducing apparatus, and the method further comprises downloading a program for remote-controlling the audio reproducing apparatus from an external server to the mobile phone via the mobile phone network.

4. The remote control method according to claim 1, further comprising:

sending reproduction information, which relates to audio data that is currently reproduced by the audio reproducing apparatus, from the audio reproducing apparatus to the wireless terminal by a wireless signal; and displaying the reproduction information on the display device of the wireless terminal.

5. A remote control method for remote-controlling an operation of an audio reproducing apparatus using a wireless terminal that is equipped with a display device, the method comprising:

establishing wireless connection between the wireless terminal and the audio reproducing apparatus;

sending an audio data acquisition request from the wireless terminal to the audio reproducing apparatus by a wireless signal;

sending, in response to the audio data acquisition request from the wireless terminal, content information, which is indicative of audio data items that are stored in a storage medium provided in the audio reproducing apparatus, from the audio reproducing apparatus to the wireless terminal by a wireless signal;

displaying on the display device of the wireless terminal a list of the audio data items that are stored in the storage medium based on the content information from the audio reproducing apparatus; and sending a reproduction command, which instructs reproduction of audio data that is selected from the list of the audio data items displayed on the display device, from the wireless terminal to the audio reproducing apparatus by a wireless signal;

wherein the display device of the wireless terminal has a higher resolution than a display device that is provided on the audio reproducing apparatus, and said displaying the list of the audio data items includes displaying on the display device of the wireless terminal a list of audio data items, which contains a greater quatity of audio data items than a list of audio data items that is displayable on the display device of the audio reproducing apparatus.

6. A remote control method for remote-controlling an operation of an audio reproducing apparatus using a wireless terminal that is equipped with a display device, the method comprising:

establishing wireless connection between the wireless terminal and the audio reproducing apparatus;

sending an audio data acquisition request from the wireless terminal to the audio reproducing apparatus by a wireless signal;

sending, in response to the audio data acquisition request from the wireless terminal, content information, which is indicative of audio data items that are stored in a storage medium provided in the audio reproducing apparatus, from the audio reproducing apparatus to the wireless terminal by a wireless signal;

displaying on the display device of the wireless terminal a list of the audio data items that are stored in the storage medium based on the content information from the audio reproducing apparatus;

sending a reproduction command, which instructs reproduction of audio data that is selected from the list of the audio data items displayed on the display device, from the wireless terminal to the audio reproducing apparatus by a wireless signal;

sending reproduction control information, which adjusts a sound volume and a sound quality of audio data that is reproduced, from the wireless terminal to the audio reproducing apparatus by a wireless signal;

storing reproduction environment information, which is indicative of an audio data reproduction environment of the audio reproducing apparatus that is set based on the reproduction control information, in a memory device of the audio reproducing apparatus in association with identification information for identifying the wireless terminal; and retrieving, when a wireless terminal is newly connected to the audio reproducing apparatus, reproduction environment information corresponding to the identification information of the newly connected wireless terminal from the memory device, and restoring, based on the retrieved reproduction environment information, an audio data reproduction environment of the audio reproducing apparatus to an audio data reproduction environment corresponding to the newly connected wireless terminal.

7. A wireless terminal that is equipped with a display device and remote-controls an operation of an audio reproducing apparatus, the wireless terminal comprising:

means for establishing wireless connection to the audio reproducing apparatus;

means for acquiring, from the audio reproducing apparatus by wireless communication with the audio reproducing apparatus, content information, which is indicative of audio data items that are stored in a storage medium provided in the audio reproducing apparatus;

means for displaying on the display device of the wireless terminal a list of the audio data items that are stored in the storage medium based on the content information acquired from the audio reproducing apparatus;

means for sending a reproduction command, which instructs reproduction of audio data that is selected from the list of the audio data items displayed on the display device, to the audio reproducing apparatus by a wireless signal; and means for disconnecting, if the wireless terminal is not operated for a predetermined time period, wireless connection between the wireless terminal and the audio reproducing apparatus in a state in which an operation of reproducing audio data by the audio reproducing apparatus is continued.

8. A wireless terminal that remote-controls an operation of an audio reproducing apparatus, the wireless terminal comprising:

a display device including a higher resolution than a display device that is provided on the audio reproducing apparatus;

means for establishing wireless connection to the audio reproducing apparatus;

means for acquiring, from the audio reproducing apparatus by wireless communication with the audio reproducing apparatus, content information, which is indicative of audio data items that are stored in a storage medium provided in the audio reproducing apparatus;

means for displaying on the display device of the wireless terminal a list of the audio data items that are stored in the storage medium based on the content information acquired from the audio reproducing apparatus, the list containing a greater quantity of audio data items than a list of audio data items that is displayable on the display device of the audio reproducing apparatus; and means for sending a reproduction command, which instructs reproduction of audio data that is selected from the list of the audio data items displayed on the display device, to the audio reproducing apparatus by a wireless signal.

* * * * *